US012617460B2

(12) United States Patent
Lee

(10) Patent No.: US 12,617,460 B2
(45) Date of Patent: May 5, 2026

(54) VEHICLE AND HANDS-OFF STATE DETECTION METHOD THEREOF

(71) Applicants: HYUNDAI MOTOR COMPANY, Seoul (KR); KIA CORPORATION, Seoul (KR)

(72) Inventor: Dongseob Lee, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 430 days.

(21) Appl. No.: 18/488,762

(22) Filed: Oct. 17, 2023

(65) Prior Publication Data

US 2024/0140526 A1     May 2, 2024

(30) Foreign Application Priority Data

Nov. 2, 2022     (KR) ........................ 10-2022-0144531

(51) Int. Cl.
    *B62D 6/10*       (2006.01)
    *B62D 15/02*     (2006.01)

(52) U.S. Cl.
    CPC ........... *B62D 6/10* (2013.01); *B62D 15/0215* (2013.01); *B62D 15/0225* (2013.01); *B62D 15/025* (2013.01)

(58) Field of Classification Search
    CPC .............. B62D 5/0481; B62D 15/0215; B62D 15/0225; B62D 6/10; B62D 15/025; B62D 1/286; B62D 5/0421; B62D 5/0463; B62D 15/021; B60W 30/12; B60W 2422/50; B60W 2510/20; B60W 2540/18; B60Y 2300/12; B60Y 2400/83
See application file for complete search history.

(56) References Cited

U.S. PATENT DOCUMENTS

| | | | | |
|---|---|---|---|---|
| 9,475,521 B1 * | 10/2016 | Fung | .................... | B62D 15/025 |
| 2013/0124046 A1 * | 5/2013 | Lazic | .................... | B60W 50/14 |
| | | | | 701/42 |
| 2016/0167707 A1 * | 6/2016 | Lee | ...................... | B62D 15/029 |
| | | | | 701/41 |
| 2019/0061769 A1 * | 2/2019 | Panse | ................... | G06V 20/597 |
| 2020/0001912 A1 * | 1/2020 | Abuaita | ................ | B62D 1/181 |
| 2020/0108853 A1 * | 4/2020 | Moreillon | ............... | B62D 7/09 |
| 2020/0307453 A1 * | 10/2020 | Kim | ....................... | G06V 20/56 |
| 2020/0353978 A1 * | 11/2020 | Hwang | ................... | B62D 6/10 |
| 2021/0122366 A1 * | 4/2021 | Lee | ......................... | B60W 10/04 |
| 2022/0126913 A1 * | 4/2022 | Kitazume | ......... | B62D 15/0215 |
| 2022/0161846 A1 * | 5/2022 | Ghanbari | ............. | B60W 30/12 |
| 2022/0281520 A1 * | 9/2022 | Fujimoto | ............ | B62D 5/0481 |
| 2023/0012974 A1 * | 1/2023 | Kim | ..................... | B62D 5/0472 |

(Continued)

FOREIGN PATENT DOCUMENTS

| | | | | | |
|---|---|---|---|---|---|
| CN | 113619590 A | * | 11/2021 | ........... | B60W 40/00 |
| DE | 102014208862 A1 | * | 11/2015 | ............ | G01L 5/221 |

(Continued)

*Primary Examiner* — Paul N Dickson
*Assistant Examiner* — Matthew D Lee
(74) *Attorney, Agent, or Firm* — Fish & Richardson P.C.

(57) ABSTRACT

A hands-off state detection method of a vehicle includes determining a difference between a pinion angle and a column angle of a motor-driven power steering (MDPS) system of the vehicle, and determining a hands-off state of a steering wheel of the vehicle based on the difference between the pinion angle and the column angle.

12 Claims, 11 Drawing Sheets

(56)        References Cited

U.S. PATENT DOCUMENTS

| | | | | |
|---|---|---|---|---|
| 2023/0271609 A1* | 8/2023 | Eriksson | ........... | B60W 60/0016 |
| | | | | 701/41 |
| 2023/0311983 A1* | 10/2023 | Herman | ............... | B62D 15/021 |
| 2024/0034408 A1* | 2/2024 | Suzuki | ................. | B62D 15/025 |
| 2024/0051542 A1* | 2/2024 | Ando | ................. | B60W 30/182 |
| 2024/0140526 A1* | 5/2024 | Lee | ................... | B62D 15/0225 |
| 2024/0199062 A1* | 6/2024 | Park | ...................... | B60W 40/08 |
| 2024/0217579 A1* | 7/2024 | Kirschbaum | .......... | B62D 1/286 |
| 2024/0343293 A1* | 10/2024 | Kohári | ................... | B62D 1/286 |
| 2025/0050917 A1* | 2/2025 | Kang | ................. | B60W 60/007 |
| 2025/0058828 A1* | 2/2025 | Shoji | ................... | B62D 15/024 |
| 2025/0282347 A1* | 9/2025 | Inoue | ................... | B60W 30/09 |
| 2025/0376213 A1* | 12/2025 | Habibnejad Korayem | ................. | |
| | | | | B62D 6/00 |

FOREIGN PATENT DOCUMENTS

| | | | | | |
|---|---|---|---|---|---|
| DE | 112016002795 T5 * | 3/2018 | ............... | B62D 6/08 |
| EP | 3003768 B1 * | 10/2018 | .......... | B60W 30/146 |
| EP | 3572303 A1 * | 11/2019 | ............... | B62D 6/00 |
| GB | 2590877 A * | 7/2021 | ........... | B60W 40/08 |
| JP | 2019182393 A * | 10/2019 | | |
| JP | 2019206230 A * | 12/2019 | | |
| KR | 20210055830 A * | 5/2021 | ............... | B62D 1/06 |
| KR | 20230025111 A * | 2/2023 | ........... | B60W 50/08 |
| WO | WO-2011020631 A1 * | 2/2011 | ........... | B62D 15/025 |

* cited by examiner

GRIP
POSITION

<LKA-ON + ACTIVE GRIP>

VEHICLE AND HANDS-OFF STATE DETECTION METHOD THEREOF

CROSS-REFERENCE TO RELATED APPLICATION(S)

This application is based on and claims priority under 35 U.S.C. § 119 to Korean Patent Application No. 10-2022-0144531, filed on Nov. 2, 2022, in the Korean Intellectual Property Office, the disclosure of which is incorporated by reference herein in its entirety.

TECHNICAL FIELD

The disclosure relates to a vehicle and a hands-off state detection method thereof.

BACKGROUND

A steering angle signal of a vehicle serves in various aspects of driving. For example, it plays a role in ensuring safety through the operation of key safety devices, such as steering systems, electronic stability control (ESC), and steering collision avoidance systems (SCAS). Moreover, the steering angle signal also facilitates the function of driver convenience systems, including smart parking assistant systems (SPAS) and smart cruise control (SCC).

A steering angle sensor used for calculating a steering angle is installed on a steering system to measure and convert a physical signal into an electrical signal. The electrical signal is then transmitted to an electrical control unit (ECU) so as to determine steering angle information of a driver.

SUMMARY

The present the disclosure is directed to a vehicle capable of more accurately detecting a hands-on/off state of a steering wheel of the vehicle, and a hands-off state detection method thereof.

In accordance with an aspect of the disclosure, a hands-off state detection method of a vehicle includes determining a difference between a pinion angle and a column angle of a motor-driven power steering (MDPS) system of the vehicle, and determining a hands-off state of a steering wheel of the vehicle based on the difference between the pinion angle and the column angle.

The hands-off state detection method may further include determining as the hands-off state in which a driver takes the hands of the driver off the steering wheel when it is detected that the difference between the pinion angle and the column angle is 0 degrees for a preset number of times or more for a preset time.

The hands-off state detection method may further include, when it is not the hands-off state, determining the strength of the driver's grasp of the steering wheel according to the difference between the distribution of the difference between the pinion angle and the column angle and the 0 degree.

The hands-off state detection method may further include detecting the hands-off state of the steering wheel while the vehicle is driving in a driving assist control mode.

The driving assist control mode may include a lane keeping assist control mode.

The motor-driven power steering (MDPS) system may be provided in a rack mounting method (R-MDPS).

In accordance with another aspect of the disclosure, a vehicle includes a torque angle sensor provided to detect a difference between a pinion angle and a column angle of a motor-driven power steering (MDPS) system of the vehicle, and an electronic control unit configured to determine the difference between the pinion angle and the column angle of the motor-driven power steering (MDPS) system, and determine a hands-off state of a steering wheel of the vehicle based on the difference between the pinion angle and the column angle.

The electronic control unit may determine as the hands-off state in which a driver takes the hands of the driver off the steering wheel when it is detected that the difference between the pinion angle and the column angle is 0 degrees for a preset number of times or more for a preset time.

The electronic control unit may determine that, when it is not the hands-off state, the strength of the driver's grasp of the steering wheel according to the difference between the distribution of the difference between the pinion angle and the column angle and the 0 degree.

The electronic control unit may determine detect the hands-off state of the steering wheel while the vehicle is driving in a driving assist control mode.

The driving assist control mode may include a lane keeping assist control mode.

The motor-driven power steering (MDPS) system may be provided in a rack mounting method (R-MDPS).

DETAILED DESCRIPTION

Figure 1:
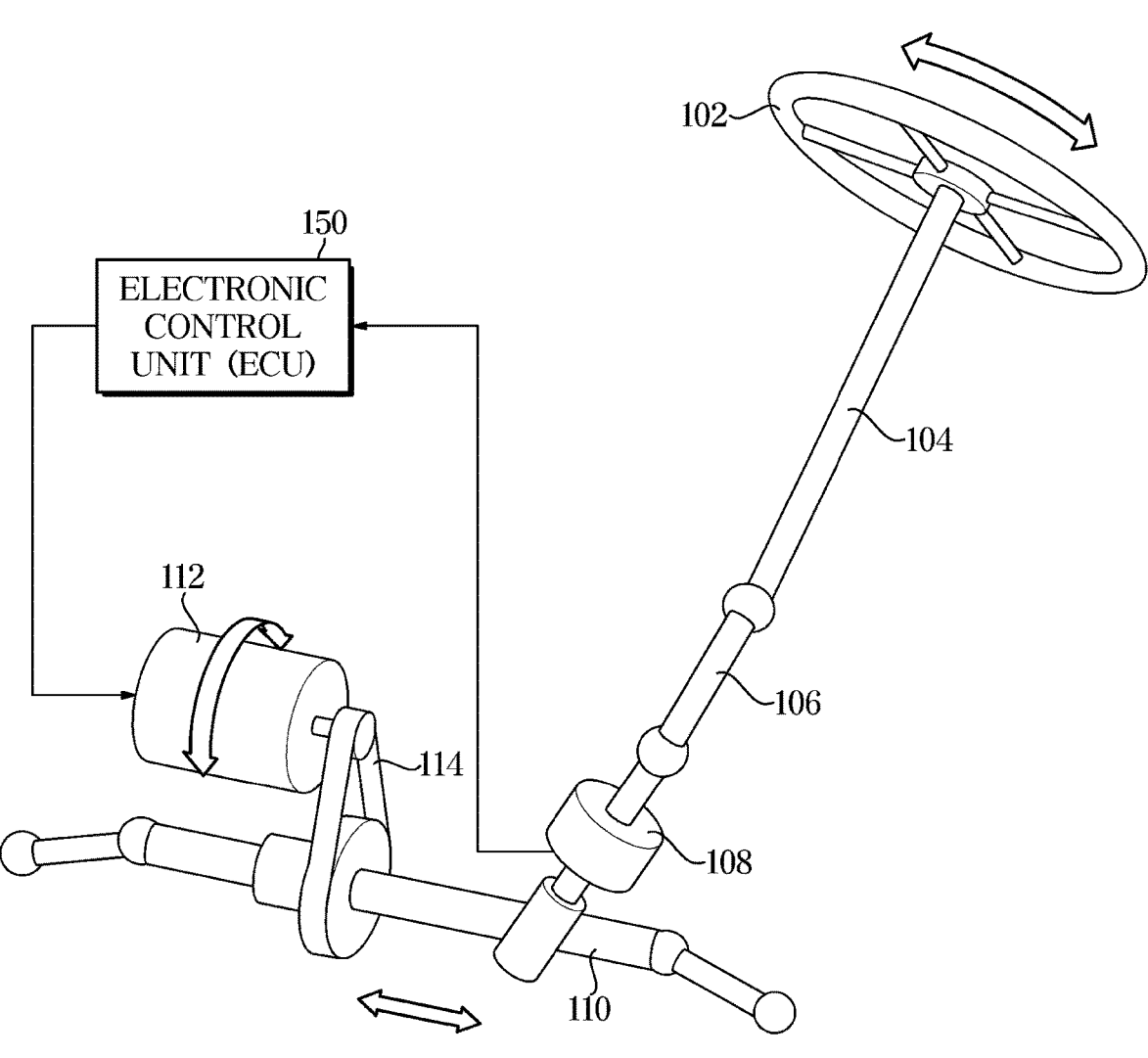
FIG. 1 is a diagram illustrating an example of an MDPS system of a vehicle.

Throughout the specification, like reference numerals refer to like elements. This specification does not describe all factors of embodiments, and duplicative contents between general contents or embodiments in the technical field of the disclosure will be omitted. The terms 'member,' 'unit,' 'module,' and 'device' used in this specification may be embodied as software or hardware, and it is also possible for a plurality of 'members,' 'units,' 'modules,' and 'devices' to be embodied as one component, or one 'member,' 'unit,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

Throughout the specification, when an element is referred to as being located "on" or "over" another element, this includes not only a case in which an element is in contact with another element but also a case in which another element exists between the two elements.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, an operation principle and embodiments of the disclosure will be described with reference to the accompanying drawings.

FIG. 1 is a diagram illustrating an MDPS system of a vehicle.

As illustrated in FIG. 1, rotation of a steering wheel 102 is transmitted to a torque angle sensor 108 through a column 104 and a U-joint 106. The torque angle sensor 108 measures a steering torque and steering angle depending on the rotation of the steering wheel 102 and transmits the measured torque and angle to an electronic control unit (ECU) 150. The electronic control unit 150 drives a motor 112 to generate a rotational force corresponding to the steering torque and steering angle detected through the torque angle sensor 108. A rack bar 110 is reciprocally moved along a longitudinal direction of the rack bar 110 through a belt 114 by the rotational force of the motor 112 caused by this drive. A rotation direction of the motor 112, that is, a movement direction of the rack bar 110 follows the same direction as a rotation direction of the steering wheel 102.

At least one component may be added or deleted depending on the performance of components of the MDPS system of the vehicle illustrated in FIG. 1. It will be easily understood by those skilled in the art that the mutual positions of the components may be changed depending on the performance or structure of the system.

Figure 2:
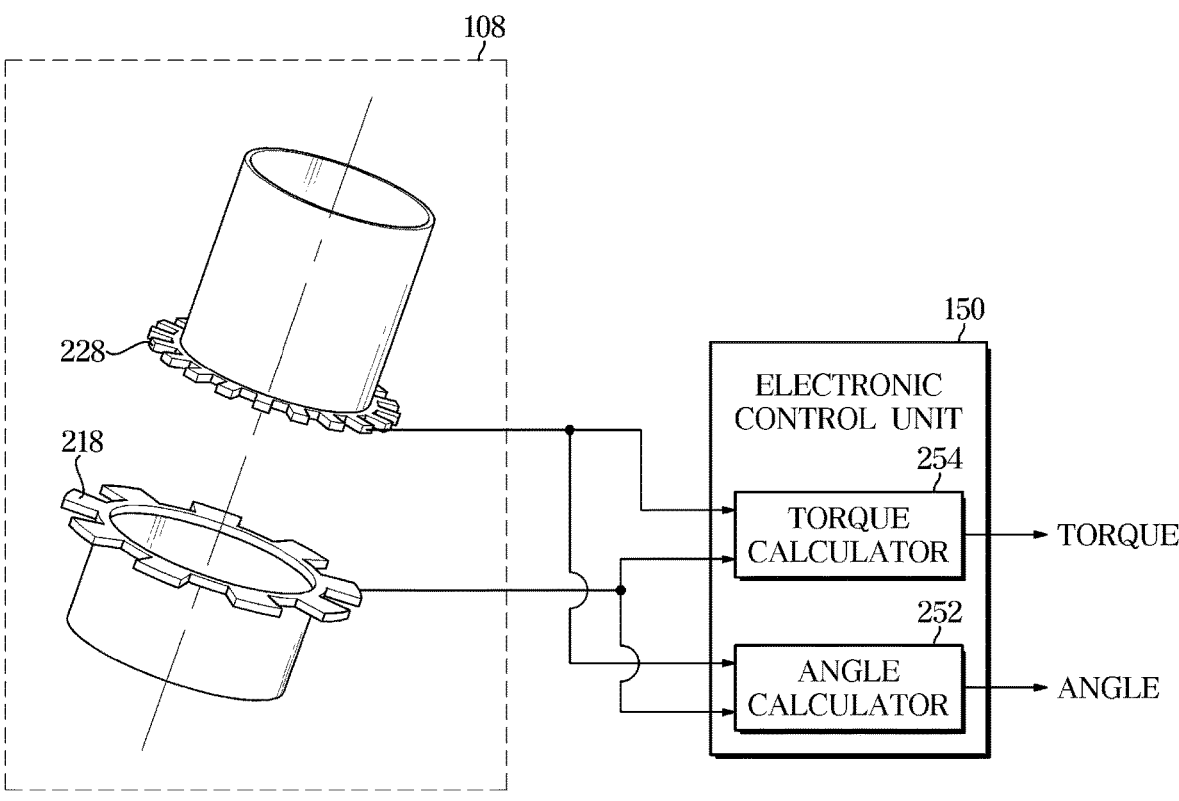
FIG. 2 is a diagram illustrating an example of a torque angle sensor and an electronic control unit.

FIG. 2 is a diagram illustrating a configuration and connection of the torque angle sensor 180 and the electronic control unit 150.

The torque angle sensor 108 includes a column rotor 228 connected to the column 104 and a pinion rotor 218 connected to the rack bar 110. A torsion bar is interposed between the column rotor 228 and the pinion rotor 218, and the torsion bar is distorted by rotation of the column rotor 228, that is, rotation of the steering wheel 102. The torque angle sensor 108 detects a degree of distortion of the torsion bar. The electronic control unit 150 includes a torque calculator 254 and an angle calculator 252. The torque calculator 254 calculates a steering torque of the steering wheel 102 from rotational angles of the pinion rotor 218 and the column rotor 228. The angle calculator 252 calculates a steering angle of the steering wheel 102 from the rotational angles of the pinion rotor 218 and the column rotor 228. Also, the angle calculator 252 calculates an angle of the pinion rotor 218 and an angle of the column rotor 228, respectively, and calculates a difference between the angle of the pinion rotor 218 and the angle of the column rotor 228. In some implementations, the electronic control unit 150 determines whether the driver grips the steering wheel 102 based on the difference between the angle of the pinion rotor 218 and the angle of the column rotor 228 calculated as described above (hands-on/off state).

The electronic control unit 150 may be implemented as a memory for storing an algorithm for controlling the operations of components inside the vehicle 1 or data for a program reproducing the algorithm and a processor for performing the above-described operations using data stored in the memory. In this case, the memory may be implemented as a separate chip from the processor or may be implemented as a single chip with the processor.

Figure 3:
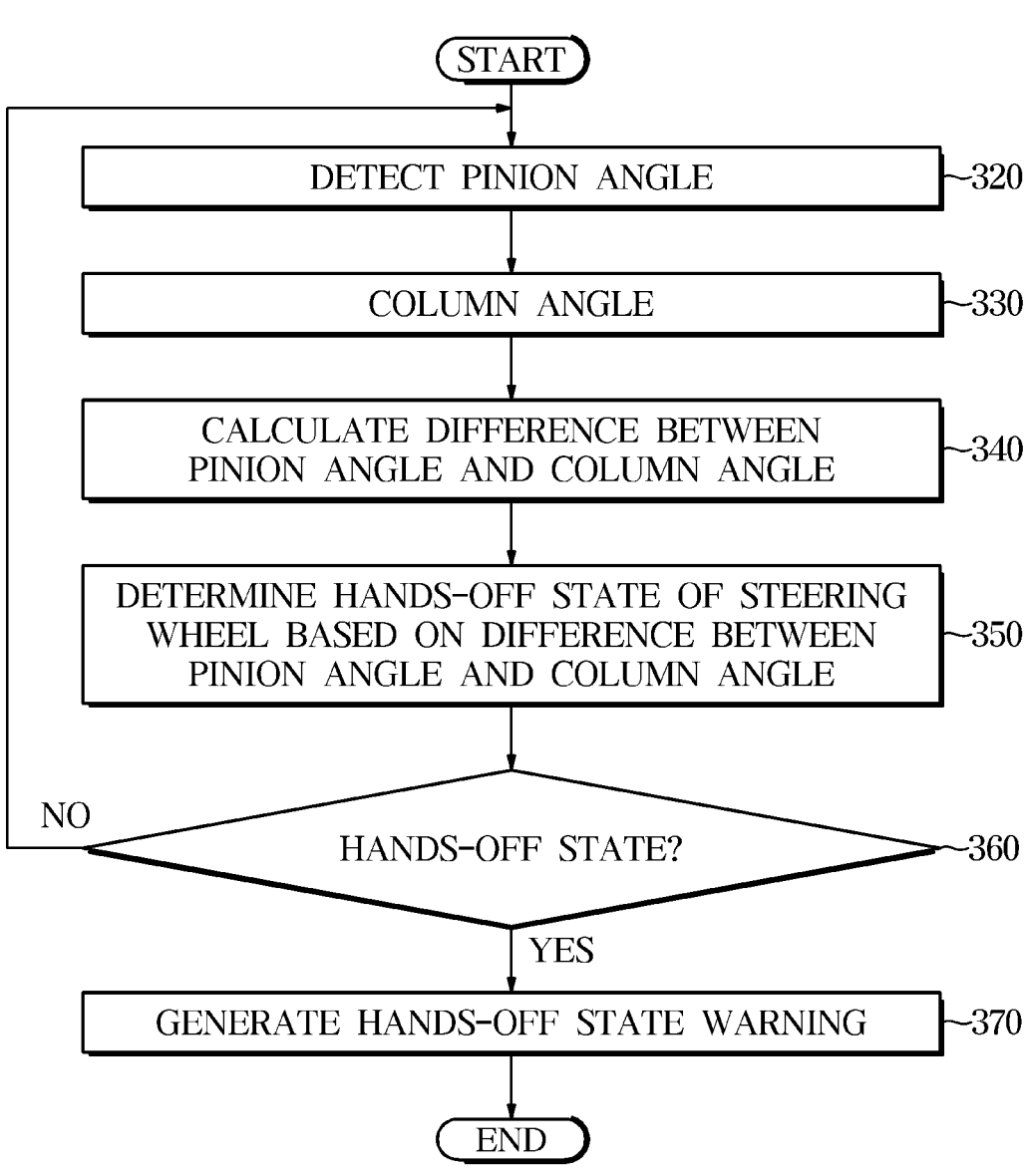
FIG. 3 is a flowchart illustrating an example of a method of detecting a hands-off state of the vehicle.

FIG. 3 is a flowchart illustrating a method of detecting a hands-off state of the vehicle. The hands-off state detection method of FIG. 3 may be performed while the vehicle is driving in a driving assist control mode, particularly while the vehicle is driving in a lane keeping assist control mode.

As illustrated in FIG. 3, the electronic control unit 150 detects an angle of the pinion rotor 218, that is, a pinion angle, from the pinion rotor 218 (320).

In addition, the electronic control unit 150 detects an angle of the column rotor 228, that is, a column angle, from the column rotor 228 (330).

After detecting the pinion angle and the column angle, the electronic control unit 150 calculates a difference between the pinion angle and the column angle (340). The difference between the pinion angle and the column angle is a value obtained by subtracting the column angle from the pinion angle.

The electronic control unit 150 determines the hands-off state of the steering wheel 102 based on the difference between the pinion angle and the column angle (350). That is, the electronic control unit 150 determines whether the driver grips the hands of the driver on the steering wheel 102 (hands-on state) or takes the hands of the driver off the steering wheel 102 (hands-off state). In some implementations, a principle of determining the hands-off state of the steering wheel 102 based on a difference between a pinion angle and a column angle will be described later in detail with reference to FIGS. 4 to 9. In some implementations, the hands-off state of the steering wheel 102 may be determined by considering not only the difference between the pinion angle and the column angle, but also an amount of steering torque. That is, the electronic control unit 150 detects the steering torque through the torque angle sensor 108, as previously mentioned in the description of FIG. 1, and may determine hands-off state of the steering wheel 102 based on both the difference between the pinion angle and the column angle and the amount of the steering torque.

When the driver does not grip the steering wheel 102, that is, takes the hands of the driver off the steering wheel 102 (hands-off state) ('YES' in 360), the electronic control unit 150 may induce the driver to grip the steering wheel 102 by generating a hands-off state warning (370).

FIGS. 4 to 9 are diagrams for explaining a principle of determining the hands-off state of the steering wheel 102 based on differences between pinion angles and column angles in the vehicle. FIGS. 4A-4B illustrate a distribution of differences between pinion angles and column angles depending on the hands-on/off state of the steering wheel 102. FIGS. 5 to 9 are diagrams illustrating a distribution of differences between pinion angles and column angles depending on a combination of an on/off state of the lane keeping assist control mode and the hands-on/off state.

Figure 4A:
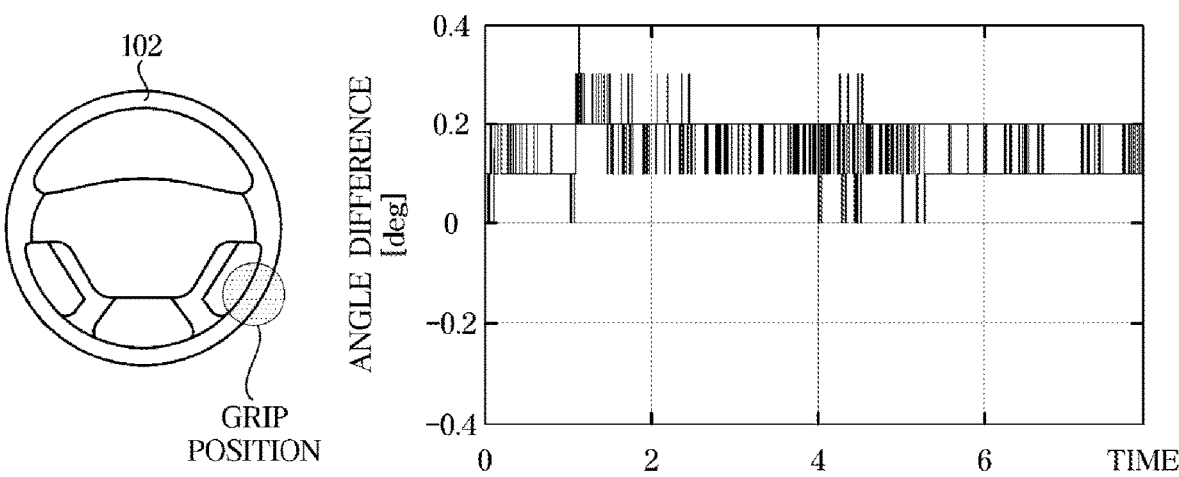
FIGS. 4A and 4B are diagrams illustrating example distributions of differences between pinion angles and column angles depending on a hands-on/off state of a steering wheel.
Figure 4B:
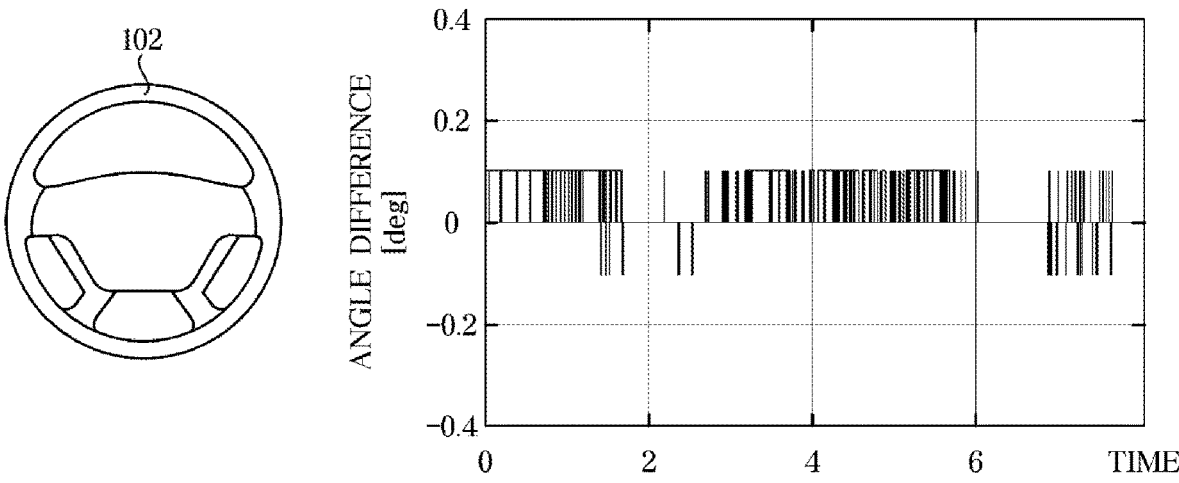

In FIG. 4, FIG. 4A illustrates a distribution of differences between pinion angles and column angles when the driver grips the steering wheel 102 (hands-on state), and FIG. 4B illustrates a distribution of differences between pinion angles and column angles when the driver takes the hands of the driver off the steering wheel 102 (hands-off state).

As illustrated in FIG. 4A, it may be seen that the differences between the pinion angles and the column angles when the driver grips the steering wheel 102 (hands-on state) are distributed centering on a value larger than zero degrees. That is, it may be determined that an interval in which the differences between the pinion angles and the column angles are distributed centering on a value larger than zero degrees is in a state in which the driver grips the steering wheel 102 (hands-on state).

Unlike this, as illustrated in FIG. 4B, it may be seen that the differences between the pinion angles and the column angles when the driver takes the hands of the driver off the steering wheel 102 (hands-off state) are distributed centering on zero degrees. That is, it may be determined that an interval in which the differences between the pinion angles and the column angles are distributed centering on zero degrees is in a state in which the driver takes the hands of the driver off the steering wheel 102 (hands-off state).

In FIGS. 4A and 4B, that the difference between the pinion angle and the column angle has a positive sign means that the pinion angle is larger than the column angle. Conversely, that the difference between the pinion angle and the column angle has a negative sign means that the pinion angle is smaller than the column angle. The meanings of positive and negative signs in the difference between the pinion angle and the column angle are the same as in the case of FIGS. 5 to 9, which will be described later.

Figure 5:
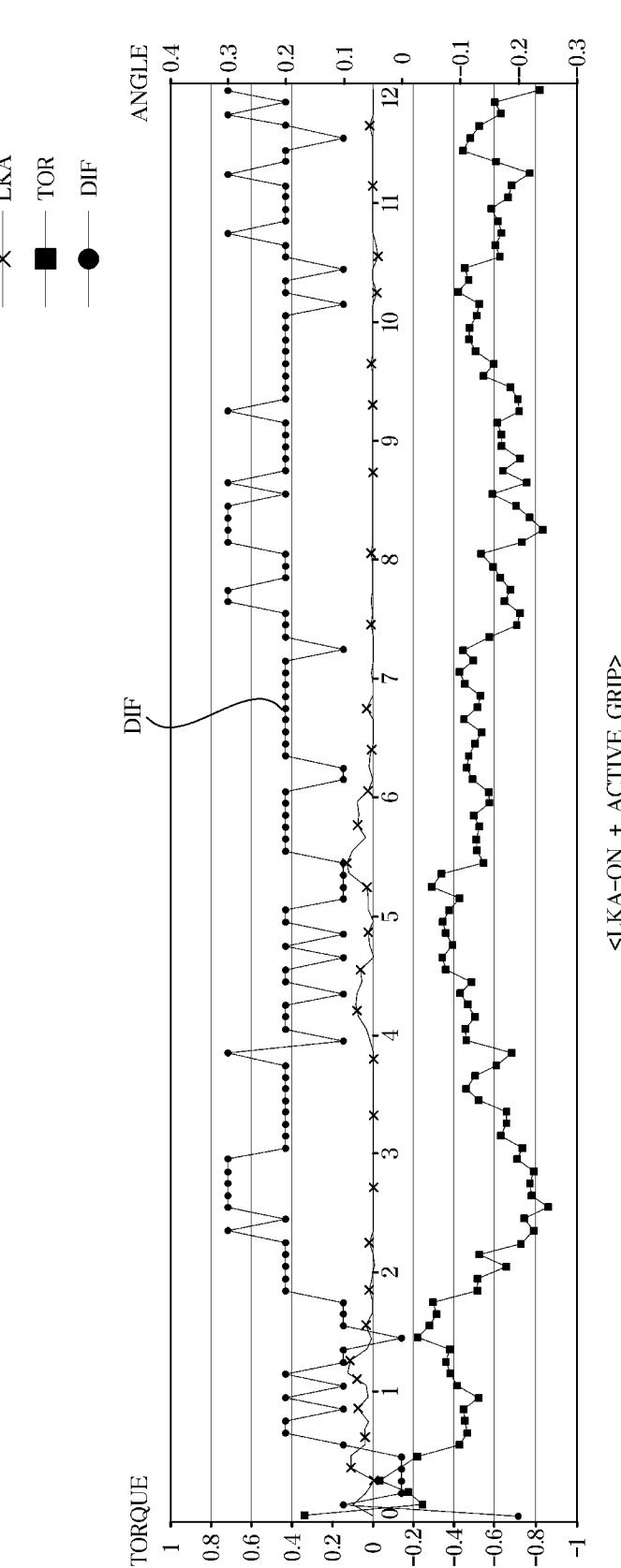
FIG. 5 is a graph illustrating an example of control values (LKA) and steering torques (TOR) in a lane keeping assist control mode, and differences (DIF) between pinion angles and column angles, in a case where a driver grips the steering wheel with the hands of the driver in a state in which the lane keeping assist control mode is activated (LKA-on state).

FIG. 5 is a graph illustrating control values (LKA) and steering torques (TOR) in a lane keeping assist control mode, and differences (DIF) between pinion angles and column angles, in a case where a driver grips the steering wheel 102 with both the hands of the driver in a state in which the lane keeping assist control mode is activated (LKA-on state). In this case, the state in which the driver grips the steering wheel 102 is an 'active grip' state in which the driver strongly grips the steering wheel 102 with both the hands. As illustrated in FIG. 5, the differences between the pinion angles and the column angles when the driver grips the steering wheel 102 (hands-on state) are distributed centering on a value larger than zero degrees. That is, it may be determined that the interval in which the differences between the pinion angles and the column angles are distributed centering on the value larger than zero degrees is in a state in which the driver grips the steering wheel 102 (hands-on state). In other words, in the present disclosure, when it is not a hands-off state will be described later, the strength of the driver's grasp of the steering wheel may be determined according to the difference between the distribution of the difference between the pinion angle and the column angle and the zero degree.

Figure 6:
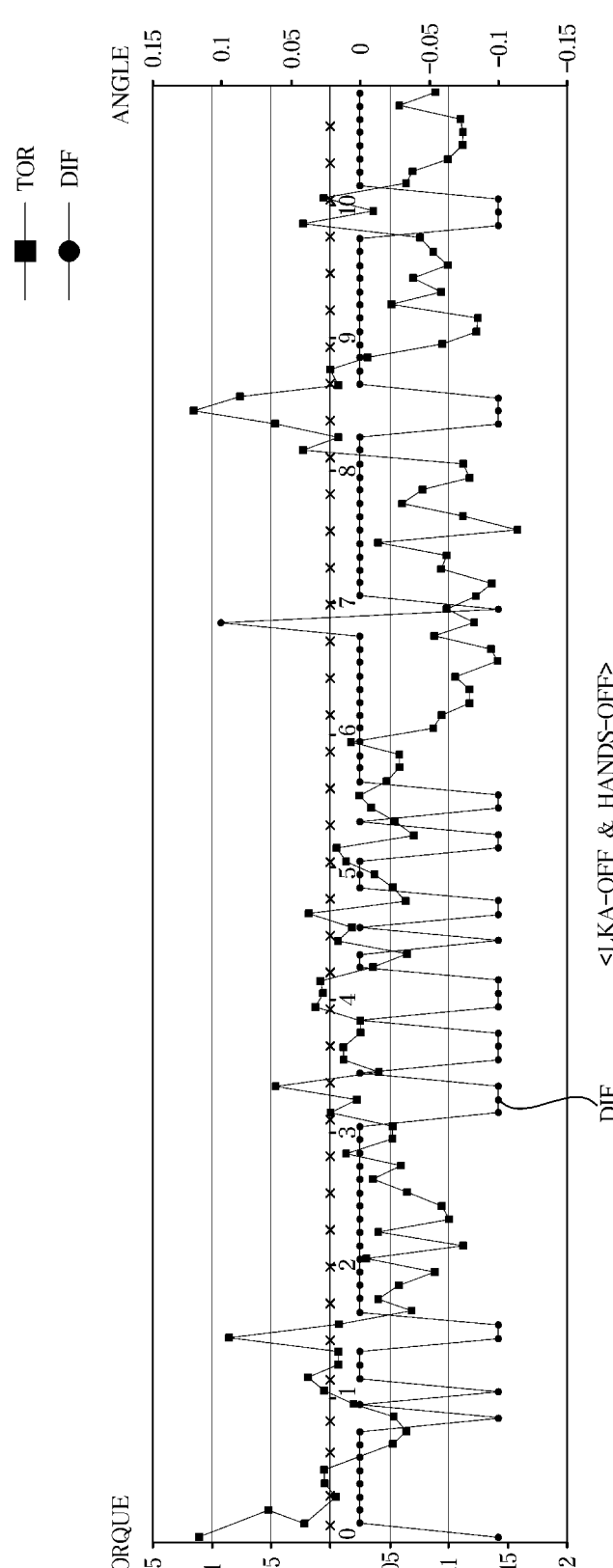
FIG. 6 is a graph illustrating an example of control values (LKA) and steering torques (TOR) in the lane keeping assist control mode, and differences (DIF) between pinion angles and column angles, in a case where the driver takes the hands of the driver off the steering wheel (hands-off state) in a state in which the lane keeping assist control mode is inactivated (LKA-off state).

FIG. 6 is a graph illustrating control values (LKA) and steering torques (TOR) in the lane keeping assist control mode, and differences (DIF) between pinion angles and column angles, in a case where the driver takes the hands of the driver off the steering wheel (hands-off state) in a state in which the lane keeping assist control mode is inactivated (LKA-off state). As illustrated in FIG. 6, the differences between the pinion angles and the column angles when the driver takes the hands of the driver off the steering wheel 102 (hands-off state) in the state in which the lane keeping assist control mode is inactivated (LKA-off state) are distributed mostly below zero degrees. That is, it may be determined that the interval in which the differences (DIF) between the pinion angles and the column angles are distributed mostly below zero degrees is in a state in which the driver takes the hands of the driver off the steering wheel 102 (hands-off state).

Figure 7:
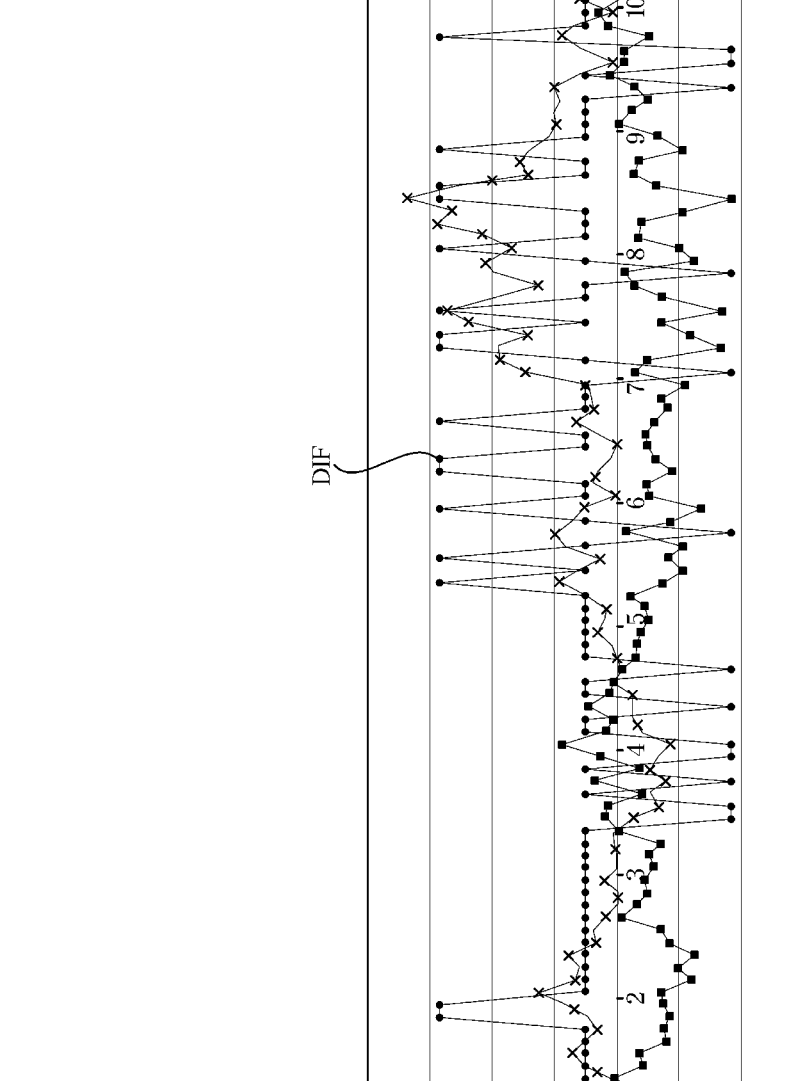
FIG. 7 is a graph illustrating an example of control values (LKA) and steering torques (TOR) in the lane keeping assist control mode, and differences (DIF) between pinion angles and column angles, in a case where the driver takes the hands of the driver off the steering wheel (hands-off state) in the state in which the lane keeping assist control mode is activated (LKA-on state).

FIG. 7 is a graph illustrating control values (LKA) and steering torques (TOR) in the lane keeping assist control mode, and differences (DIF) between pinion angles and column angles, in a case where the driver takes the hands of the driver off the steering wheel (hands-off state) in the state in which the lane keeping assist control mode is activated (LKA-on state). As illustrated in FIG. 7, the differences between the pinion angles and the column angles when the driver takes the hands of the driver off the steering wheel 102 (hands-off state) in the state in which the lane keeping assist control mode is inactivated (LKA-off state) are distributed centering on zero degrees. That is, it may be determined that the interval in which the differences between the pinion angles and the column angles are distributed centering on zero degrees is in a state in which the driver takes the hands of the driver off the steering wheel 102 (hands-off state).

Figure 8:
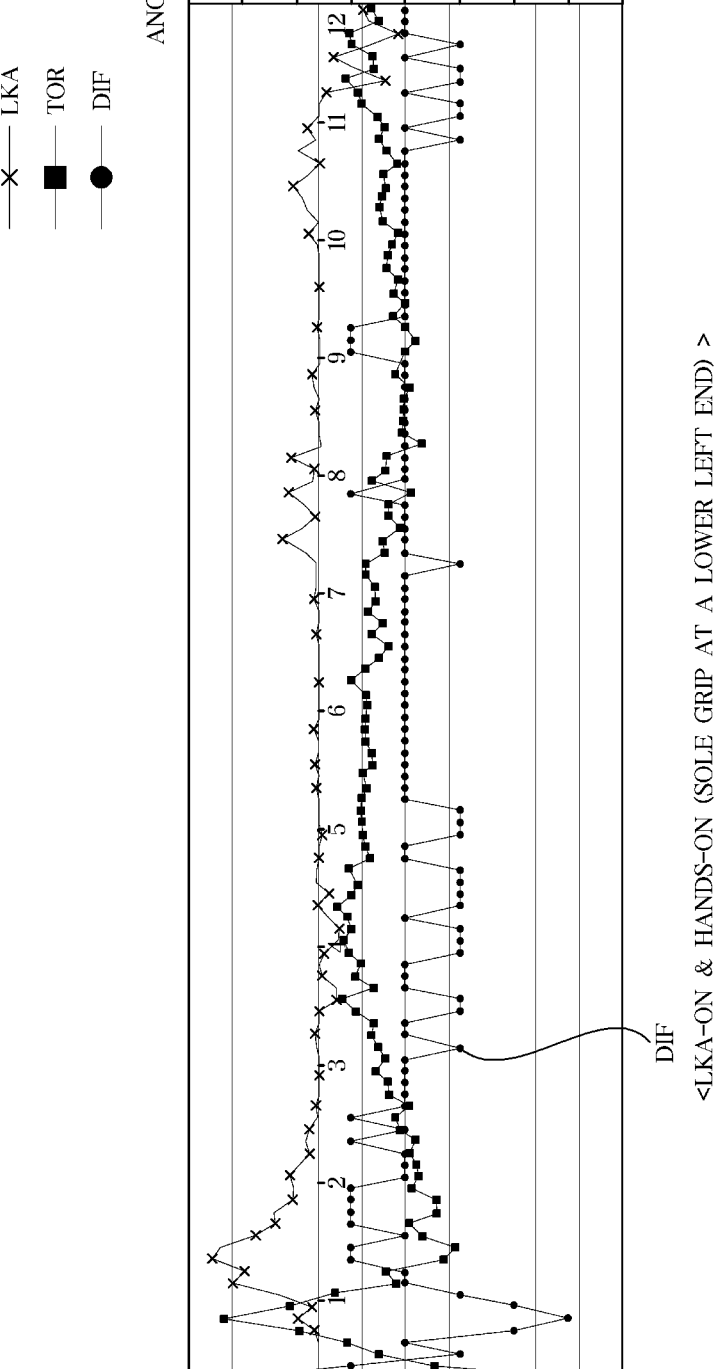
FIG. 8 is a graph illustrating an example of control values (LKA) and steering torques (TOR) in the lane keeping assist control mode, and differences (DIF) between pinion angles and column angles, in a case where the driver grips only a third quadrant of the steering wheel with only the left hand of the driver in the state in which the lane keeping assist control mode is activated (LKA-on state).

FIG. 8 is a graph illustrating control values (LKA) and steering torques (TOR) in the lane keeping assist control mode, and differences (DIF) between pinion angles and column angles, in a case where the driver grips only a third quadrant of the steering wheel 102 with only the left hand of the driver in the state in which the lane keeping assist control mode is activated (LKA-on state). In this case, the state in which the driver grips the steering wheel 102 is a 'passive grip' state in which the driver lightly (weakly) grips only one lower left end of the steering wheel 102 using only the left hand of the driver. As illustrated in FIG. 8, the differences between the pinion angles and the column angles when the driver passively grips only the third quadrant of the steering wheel 102 (hands-on state) are distributed centering on a value smaller than zero degrees (negative value). That is, it may be determined that an interval in which the differences between the pinion angles and the column angles are distributed centering on a value smaller than zero degrees (negative value) is in a state in which the driver lightly (weakly) grips only the third quadrant of the steering wheel 102 (hands-on state).

US 12,617,460 B2

7

Figure 9:
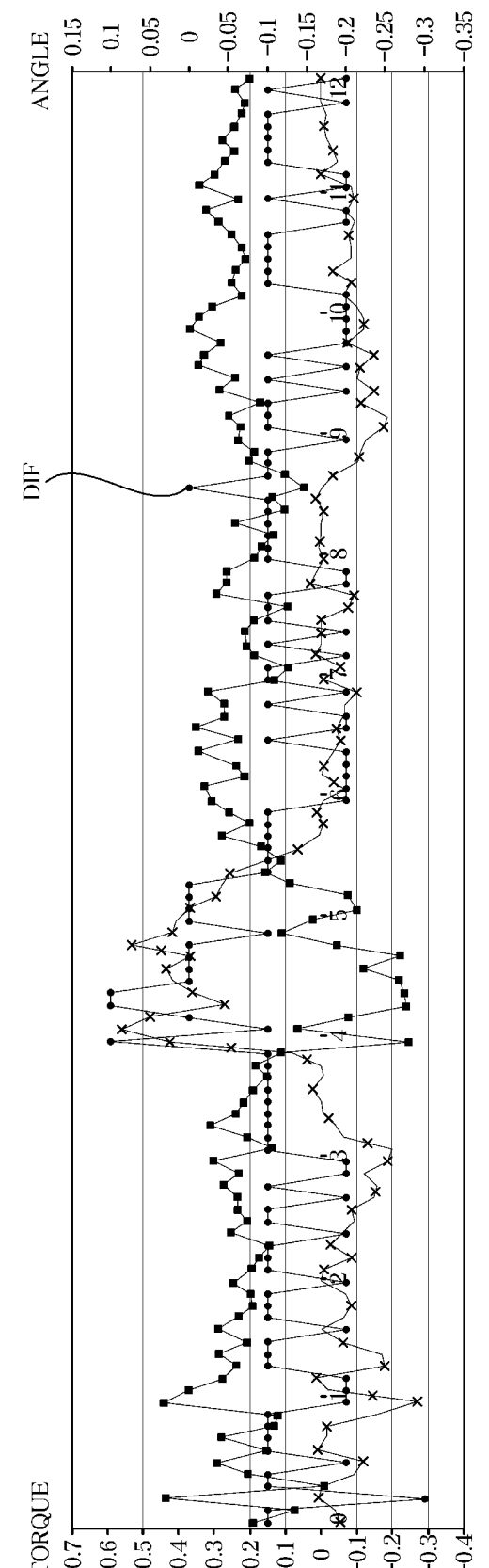
FIG. 9 is a graph illustrating an example of control values (LKA) and steering torques (TOR) in the lane keeping assist control mode, and differences (DIF) between pinion angles and column angles, in a case where the driver grips only a fourth quadrant of the steering wheel with only the right hand of the driver in the state in which the lane keeping assist control mode is activated (LKA-on state).

FIG. 9 is a graph illustrating control values (LKA) and steering torques (TOR) in the lane keeping assist control mode, and differences (DIF) between pinion angles and column angles, in a case where the driver grips only a fourth quadrant of the steering wheel 102 with only the right hand of the driver in the state in which the lane keeping assist control mode is activated (LKA-on state). In this case, the state in which the driver grips the steering wheel 102 is a 'passive grip' state in which the driver lightly (weakly) grips only one lower right end of the steering wheel 102 using only the right hand of the driver. As illustrated in FIG. 9, the differences between the pinion angles and the column angles when the driver passively grips only the fourth quadrant of the steering wheel 102 (hands-on state) are distributed centering on a value larger than zero degrees (positive value). That is, it may be determined that an interval in which the differences between the pinion angles and the column angles are distributed centering on a value larger than zero degrees (positive value) is in a state in which the driver lightly (weakly) grips only the fourth quadrant of the steering wheel 102 (hands-on state).

However, compared to the case of active gripping of FIG. 5 described above, unlike the case of the graph of FIG. 5, in which the differences between the pinion angles and the column angles are distributed far beyond 0 degrees, in the case of the graph of FIG. 9, the differences between the pinion angles and the column angles are distributed at positions slightly beyond 0 degrees. That is, degrees of active gripping and passive gripping may be distinguished by how much the differences between the pinion angles and the column angles exceed 0 degrees.

When a time given for determining the hands-off state is 7 seconds, it may be determined as the hands-off state only when a preset torque for determination of hands-off state (for example, 0.28 Nm) is not exceeded for 7 seconds. In a case of detecting the hands-on/off state using only a torque value of a motor-driven power steering system, when a time in 7 seconds for which a torque for determining the hands-off state is exceeded exceeds a preset time (for example, 1 second), it is determined as the hands-on state. However, in the case of determining the hands-on/off state only with the torque value, when the time for which a torque for determining the hands-off state is exceeded does not exceed the preset time (for example, 1 second), it may be determined as the hands-off state even in the hands-on state.

However, as in the hands-off state detection method of the vehicle, when the hands-on/off state of the driver is determined by how much the differences between the pinion angles and the column angles exceed 0 degrees, even if the time for which the torque for determining the hands-off state is exceeded does not exceed the preset time (for example, 1 second), because in the hands-off state, intervals in which the differences between the pinion angles and the column angles are close to 0 degrees or are 0 degrees increase, the hands-off state may be detected from an interval in which the differences between the pinion angles and the column angles are close to 0 degrees or are 0 degrees.

Figure 10:
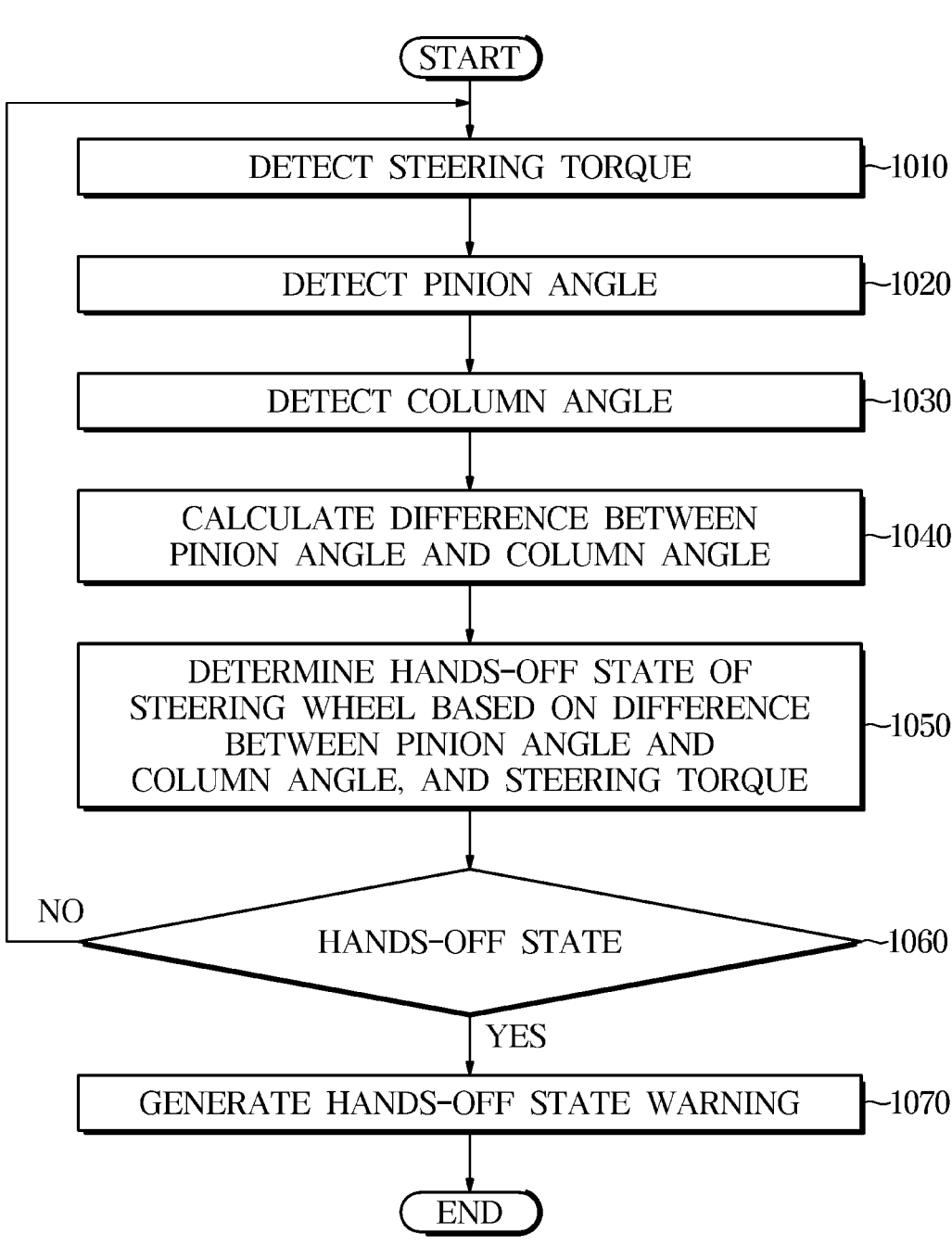
FIG. 10 is a flowchart illustrating an example of method of detecting the hands-off state of the vehicle.

FIG. 10 is a flowchart illustrating another method of detecting hands-off state of the vehicle. The hands-off state detection method of FIG. 10 may be performed while the vehicle is driving in the driving assist control mode, particularly while the vehicle is driving in the lane keeping assist control mode. In addition, compared to the hands-off state detection method of FIG. 3, the hands-off state detection method of FIG. 10 further considers a steering torque as well as the differences between the pinion angles and the column angles to determine whether the driver is in the hands-on/off state.

As illustrated in FIG. 10, the electronic control unit 150 detects a steering torque using the torque angle sensor 108. The steering torque is a torque generated by a manipulation (steering) of the steering wheel 102 of the driver.

The electronic control unit 150 also detects an angle of the pinion rotor 218, that is, a pinion angle, from the pinion rotor 218 (1020).

The electronic control unit 150 also detects an angle of the column rotor 228, that is, a column angle, from the column rotor 228 (1030).

After detecting the pinion angle and the column angle, the electronic control unit 150 calculates a difference between the pinion angle and the column angle (1040). The difference between the pinion angle and the column angle is a value obtained by subtracting the column angle from the pinion angle.

The electronic control unit 150 determines the hands-off state of the steering wheel 102 based on the difference between the pinion angle and the column angle and the steering torque (1050). That is, the electronic control unit 150 determines whether the driver grips the hands of the driver on the steering wheel 102 (hands-on state) or takes the hands of the driver off the steering wheel 102 (hands-off state). In some implementations, the principle of determining the hands-off state of the steering wheel 102 based on the difference between the pinion angle and the column angle has been described in detail above with reference to FIGS. 4 to 9. In addition, in some implementations, the hands-off state of the steering wheel 102 may be determined by considering a magnitude of steering torque as well as the difference between the pinion angle and the column angle.

When the driver does not grip the steering wheel 102, that is, when the driver takes the hands of the driver off the steering wheel 102 (hands-off state) ('YES' in 1060), the electronic control unit 150 may induce the driver to grip the steering wheel 102 by generating a hands-off warning (1070).

As is apparent from the above, a vehicle and a hands-off state detection method thereof of the disclosure can more accurately detect a hands-on/off state of a steering wheel of the vehicle.

The disclosed implementations may be implemented in the form of a recording medium storing instructions executable by a computer. The instructions may be stored in the form of program code, and when executed by a processor, a program module may be created to perform the operations of the disclosed implementations. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A hands-off state detection method of a vehicle comprising:

determining a difference between a pinion angle and a column angle of a motor-driven power steering (MDPS) system of the vehicle;

determining whether a state of a steering wheel of the vehicle is a hands-off state based on the difference between the pinion angle and the column angle, the hands-off state indicating that hands of a driver of the vehicle are spaced apart from the steering wheel; and controlling the vehicle based on the determining of the hands-off state.

2. The hands-off state detection method according to claim 1, further comprising:

determining, based on a determination that the difference between the pinion angle and the column angle is 0 degrees for a preset number of times or more for a preset time, the state of the steering wheel as the hands-off state.

3. The hands-off state detection method according to claim 2, further comprising, determining, based on the state of the steering wheel not being the hands-off state, strength of grasp of the driver on the steering wheel according to a difference between (i) distribution of the difference between the pinion angle and the column angle and (ii) the 0 degree.

4. The hands-off state detection method according to claim 1, further comprising determining the state of the steering wheel as the hands-off state while the vehicle is in a driving assist control mode.

5. The hands-off state detection method according to claim 4, wherein the driving assist control mode comprises a lane keeping assist control mode.

6. The hands-off state detection method according to claim 1, wherein the motor-driven power steering (MDPS) system is provided in a rack mounting method (R-MDPS).

10

7. A vehicle comprising:

a torque angle sensor provided to detect a difference between a pinion angle and a column angle of a motor-driven power steering (MDPS) system of the vehicle; and an electronic controller configured to:

determine the difference between the pinion angle and the column angle of the motor-driven power steering (MDPS) system, and determine whether a state of a steering wheel of the vehicle is a hands-off state based on the difference between the pinion angle and the column angle, the hands-off state indicating that hands of a driver of the vehicle are spaced apart from the steering wheel.

8. The vehicle according to claim 7, wherein the electronic controller is configured to determine, based on a determination that the difference between the pinion angle and the column angle is 0 degrees for a preset number of times or more for a preset time, the state of the steering wheel as the hands-off state.

9. The vehicle according to claim 8, wherein the electronic controller is configured to determine, based on the state of the steering wheel not being the hands-off state, strength of grasp of the driver on the steering wheel according to a difference between (i) distribution of the difference between the pinion angle and the column angle and (ii) the 0 degree.

10. The vehicle according to claim 7, wherein the electronic controller is configured to determine the state of the steering wheel as the hands-off state while the vehicle is in a driving assist control mode.

11. The vehicle according to claim 10, wherein the driving assist control mode comprises a lane keeping assist control mode.

12. The vehicle according to claim 7, wherein the motor-driven power steering (MDPS) system is provided in a rack mounting method (R-MDPS).

* * * * *